US005729014A

United States Patent [19]

Mordehai et al.

[11] Patent Number: 5,729,014

[45] Date of Patent: Mar. 17, 1998

[54] METHOD FOR INJECTION OF EXTERNALLY PRODUCED IONS INTO A QUADRUPOLE ION TRAP

[75] Inventors: Alex Mordehai, Mountain View; Sidney E. Buttrill, Jr., Palo Alto, both of Calif.

[73] Assignee: Varian Associates, Inc., Palo Alto, Calif.

[21] Appl. No.: 678,742

[22] Filed: Jul. 11, 1996

[51] Int. Cl.$^6$ .......... B01D 59/44; H01J 49/00

[52] U.S. Cl. .......... 250/282; 250/292

[58] Field of Search .......... 250/282, 292

[56] References Cited

U.S. PATENT DOCUMENTS

| | | | |
|---|---|---|---|
| 3,065,640 | 11/1962 | Langmuir et al. | 73/517 |
| 5,268,572 | 12/1993 | Mordehai et al. | 250/289 |
| 5,352,892 | 10/1994 | Mordehai et al. | 250/288 |
| 5,399,857 | 3/1995 | Doroshenko et al. | 250/292 |
| 5,479,012 | 12/1995 | Wells | 250/282 |
| 5,572,022 | 11/1996 | Schwartz et al. | 250/292 |

OTHER PUBLICATIONS

Landau & Lifshitz, *Mechanics.*, Third edition, Pergamon Press 1976., pp. 93–95, 154.

Mordehai A., Henion, J., *Rapid Communicationsin Mass Spectrometry* vol. 7 1993. pp. 205–209.

*Quadrupole Storage Mass Spectrometry and its Applications,* Peter H. Dawson, Elsevier Scientific Publishing Co., Amsterdam, 1976., pp. 210–213.

March and Hughes, *Quadrupole Storage Mass Spectrometry.,* John Wiley & Sons, Inc., 1989.

Shenheng Guan, Pasa–Tolic, L.; Marshall, A.G.: Xinzhen Xiang. "Off–Axis Injection into an ICR Ion Trap: A Means for efficient Capture of a Continuous Beam of Externally Generated Ions". *,International Journal of Mass Spectrometry and Ion Processes.* Vol. 139., 24 Nov. 1994., pp. 75–86.

Nikolaev, E.N.; Mordehai, A.V.; Talrose, V.L., "High–resolution Ion Partitioning Technique for a one–section Ion–Cyclotron–Resonance Spectrometer Cell". *,Rapid Communications in Mass Spectrometry.* Vol. 4 No. 2, 1990., pp. 64–66.

Nikolaev, E.N.; Gorshkov, M.V.; Mordehai, A.V.; Talrose, V.L., "Ion cyclotron Resonance Signal Detection at Multiples of the Cyclotron Frequency."*,Rapid Communications in Mass Spectrometry.* Vol. 4, No. 5, 1990, pp. 144–146.

Schuessler,H.A., Chun–Sing, P. "Confinement of Pulse–Injected External Ions in Magnetostatic & Electrostatic Ion Traps." *IEEE Transactions on Nuclear science.* Vol. NS–30, No. 2, Apr. 1983., pp. 1468–1471.

*Primary Examiner*—Bruce Anderson
*Attorney, Agent, or Firm*—Bella Fishman

[57] ABSTRACT

A method of ion collection over a wide mass-to-charge range from continuous ion source into a quadrupole ion trap filled with a buffer gas directing an ion beam, from an external ion source to a radio frequency ion trap through a gating device for a predetermined period of accumulation time to allow the beam to enter the trap, trapping ions over a range of masses by applying a radio frequency voltage to the trap and changing an amplitude of the radio frequency voltage adiabatically to achieve a uniform trapping efficiency for ions over a predetermined mass range. The predetermined period of accumulation time may be divided into a plurality of segments, and the amplitude of the radio-frequency voltage is changing adiabatically within each segment.

14 Claims, 7 Drawing Sheets

METHOD FOR INJECTION OF EXTERNALLY PRODUCED IONS INTO A QUADRUPOLE ION TRAP

FIELD OF THE INVENTION

This invention is related to the area of mass spectrometry and in particular to quadrupole ion trap mass spectrometry wherein an external beam of ions is injected into a radio-frequency ion trap.

BACKGROUND OF THE INVENTION

Several modern ionization techniques have been developed recently to the stage of practical importance for biochemistry, medical science and analytical chemistry including electrospray, fast atom bombardment, and chemical ionization. These ionization techniques usually provide a continuous ion beam from a liquid or solid phase sample. One of the common technical problems associated with these ionization techniques is the applicability of these techniques to ion trap mass spectrometers. Due to the nature of the sample and the ionization method, it is usually convenient and often necessary that the ion source actually be located external to the ion trap.

When externally formed ions are injected into a quadrupole ion trap there is the possibility that ions may be lost in the process. Furthermore, the fraction of ions successfully injected may vary with the ion mass. Prior art methods for ion injection do not provide uniform ion injection efficiency and this fact complicates quantitative studies and provides less than optimum sensitivity over most of the mass range of the ion trap mass spectrometer.

Uniform injection and trapping efficiency for different ion masses is crucial for analytical applications. Another important requirement is cumulative trapping characterized by the ability to accumulate ions into the trap during a prolonged accumulation time interval while maintaining substantially linear functional dependence between the number of ions of each mass in the trap and the total ionization time. It is important for the distribution of ion masses in the trap to be the same as the distribution of ion masses from the sample produced by the ion source.

The prior art methods of ion injection can be separated into two major groups according to the type of the external ion source for which it is used.

One group of methods is effective only for pulsed ion sources when a bunch or a short burst of externally produced ions is trapped. These methods utilize so called active non-adiabatic trapping where the main RF trapping field is turned on during the time when the ion bunch is entering into the trap. For example, U.S. Pat. No. 5,399,857 describes a method of trapping a burst of ions generated in an external ion source by gradually increasing the main RF trapping field during the time interval between the moment the ions enter the trap and the moment when they arrive in a region close to the center of the trap. To trap a burst of ions by this method it is necessary to produce a very sharp raise in the RF amplitude, typically from zero to several kilovolts, with a rise time of about 20 microseconds.

The term "adiabatic" has a well established meaning in the physics of mechanical systems (Landau and Lifshitz, Mechanics, Third Edition, Pergamon Press 1976, page 154). In the present case, adiabatic means that the storage RF amplitude is changed so slowly that it is effectively constant throughout a period of the slowest oscillating motion of the ions inside the ion trap. The trapping of a pulse of ions described in the previous paragraph is non-adiabatic because the increase in RF amplitude occurs within less than one period of the ions secular oscillation within the trap.

The second group of methods is designed for trapping of externally produced ions from continuous ion sources. Ions are accumulated for much longer than the short time required for an untrapped ion to enter the ion trap and pass through to the other side.

These cumulative trapping methods from continuous ion sources are passive in contrast to active, pulsed ion introduction methods. Cumulative trapping techniques are based on the scattering of ions from the external beam by a buffer gas inside the trap, while the pulse ion introduction techniques are based on a rapid, non-adiabatic increase in the RF trapping field. For example, there is a method of pressurizing a quadrupole ion trap with a pressure up to $10^{-2}$ Torr of a buffer gas to achieve cumulative trapping while operating at a constant level of the RF trapping field which is optimized for a specific mass range (A. Mordehai, J. Henion, RCMS, v.7, p. 205–209, 1993). Another cumulative technique is used in the LCQ ion trap instrument manufactured by Finnigan, where ions are introduced into the ion trap in steps with different levels of the RF amplitude at each step. FIG. 1 shows the typical RF amplitude function according to this method with three different RF amplitudes. Although in this method a wider range of mass-to-charge ratio can be injected, the injection efficiency for any given mass-to-charge ratio is subject to a large degree of variation. The stair-step adjustment of the RF amplitude cannot provide uniform and flat ion injection efficiency over the predetermined mass range. The injection efficiency for some ions also can be strongly affected in this method because at each RF amplitude level some ions with specific mass-to-charge ratios can fall into regions of reduced trapping efficiency in the ion trap stability diagram, also known as black canyons.

SUMMARY OF THE INVENTION

It is an object of the present invention to provide a method of cumulative ion injection for a predetermined mass range for a beam of externally produced ions.

It is yet another object of the invention to provide a method of external ion injection into a RF ion trap with uniform trapping efficiency over a predetermined mass range.

Another object of the present invention is to provide uniform trapping efficiency for externally produced ions over a narrow mass range to provide correct isotopic ratios in analyzed samples.

In accordance with the present invention there is provided an improved method of ion collection over a wide mass-to-charge range from continuous ion sources into quadrupole ion traps, wherein a continuous ion beam from an external ion source is directed to a radio frequency ion trap filled with a buffer gas through a gating device for a predetermined period of accumulation time which allows the ion beam to enter the ion trap. A radio frequency voltage is applied to the ion trap to create a main radio frequency field therein for trapping ions over a range of masses. The amplitude of the radio frequency voltage is changed adiabatically for achieving a uniform trapping efficiency for ions over a predetermined mass range. The change of amplitude of the radio frequency voltage is provided according to the equation $$V(t) = V_i \left[ 1 + \left( \frac{m_f}{m_i} - 1 \right) \frac{t}{t_a} \right]^{1/2}$$

wherein the RF voltage V(t) is varied from an RF initial voltage $V_i$ to an RF final voltage $V_f$ during an accumulation time $t_a$ for trapping the ions with the mass range from an initial mass $m_i$ to a final mass $m_f$.

In accordance with one aspect of the present invention, the accumulation time is a segment wherein a non-linear relationship between the RF amplitude and the accumulation time is approximated by a linear RF ramp. In accordance with another aspect of the present invention the total accumulation time comprises a plurality of segments wherein each segment is a linear RF ramp.

In the prior art injection efficiency is not uniform across a wide range of masses. The injection efficiency for cumulative trapping over the substantially prolonged accumulation time is low and it is dependent substantially upon the mass-to-charge ratios of the analyzed ions.

The foregoing and other object features and advantages of the present invention will become apparent from the following detailed description of the preferred embodiments, taken together with the accompanying drawings.

DETAILED DESCRIPTION OF THE PREFERRED EMBODIMENT

Figure 1:
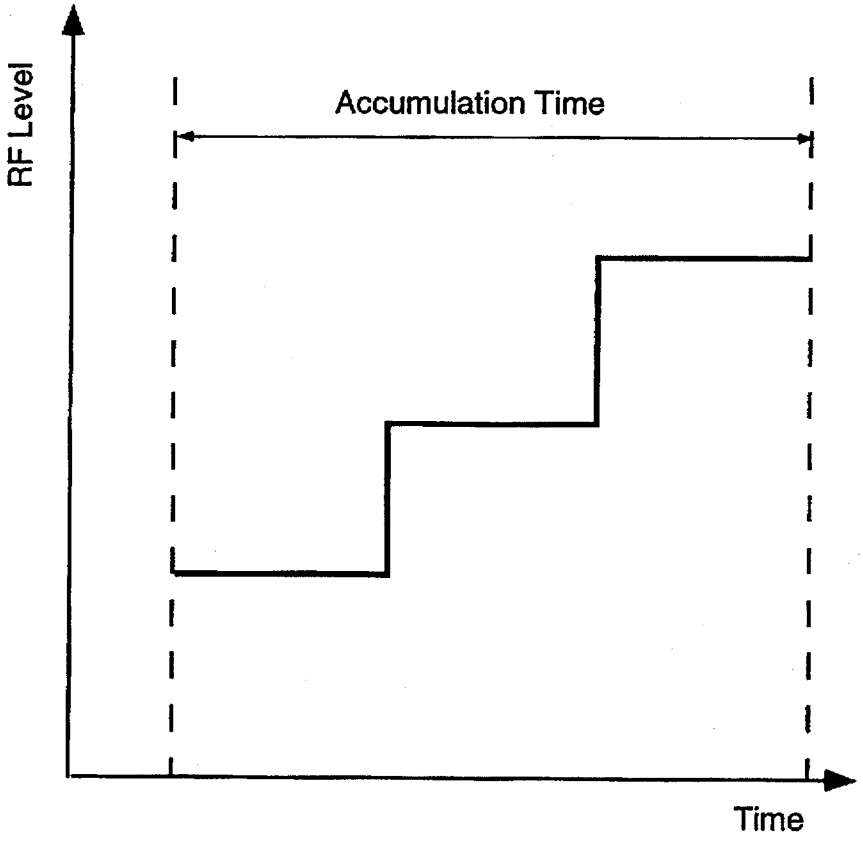
FIG. 1 (PRIOR ART)
FIG. 1 shows RF amplitude as a function of an accumulation time according to one prior art method of external ion injection.

The present invention provides a method of introducing ions from an external ion source into an ion trap. The method is distinguished by providing a uniform, high injection efficiency over a wide range of ion masses. Ions are introduced into the ion trap by gating the external beam for a certain period of time, accumulation time $t_a$. During the accumulation time, the trapping RF field is adiabatically changed through one or more periods of a calculated, optimum program to provide uniform injection efficiency over the entire mass range of interest.

When ions are injected into the ion trap filled with a buffer gas from an external source, they must pass through a transitional region at the ion trap entrance where they experience a substantial gradient of the main trapping field. This is the fringing field of the storage RF. Passing ions through this fringing field is equivalent to passing ions over a pseudopotential barrier, in exact analogy to the pseudopotential experienced by ions within the ion trap. The optimum injection efficiency characterized by best probability of trapping for an ion occurs when the ion has just enough energy to overcome the pseudopotential barrier to entering the trap. Ions with enough energy to enter the trap are moving slowly near the ion trap entrance aperture and have more time to experience collisions with differ gas or background gas and thereby lose energy. Ions which lose energy within the trap are unable to return to the ion trap entrance aperture or to reach the ion trap electrodes, and so become trapped.

To evaluate the magnitude of the pseudopotential barder, we use the Dehmelt approach ("Quadrupole Storage Mass Spectrometry", ed. P. H. Dawson, p. 210–213, Elsevier, Amsterdam, 1976). The ion motion is averaged over a period, 2 π/w, of oscillation of the main trapping field. The effect of the fringing field can be reduced to an effective barrier $D_{fr}$ given by $$D_{fr} = \frac{\xi V^2}{m w^2} \quad (1)$$

where ξ is a geometry factor, V and w are the amplitude and angular frequency of the main RF field, and m is the mass-to-charge ratio of the ion. Equation (1) is valid regardless of the details of the shape of the fringing field through which the ions must pass to enter the ion trap (see L. D. Landau and E. M. Lifshitz, Mechanics, 3rd Edn., Pergamon Press, 1976, pp. 93–95). The magnitude of the constant ξ is determined by the field geometry, including, for example, the amount of hexapole and octopole and higher order components, of the field. The important consequence of equation (1) is that ions of different mass-to-charge ratios and the same initial kinetic energy K experience different barriers at the ion trap entrance.

The use of the term ion mass will be understood to mean the ratio of ion mass to ion charge. Very often, there is only a single charge on an ion, and the numerical values of the two quantities will then be the same. Once inside the ion trap, the ions experience a trapping effect which is usually described in terms of a pseudopotential well. For ions in a purely quadrupole field, the well depth in the z direction is given by the well known expression:

$$D_h = \frac{eV^2}{4 m z_0^2 w^2} \quad (2)$$

where $D_h$ is the well depth and $z_0$ is the characteristic dimension of the ion trap in the axial direction. The variation of the trapping well depth with the RF storage amplitude V and angular frequency w and the ion mass m is the same as for the barrier to entry into the trap from outside.

Figure 2A:
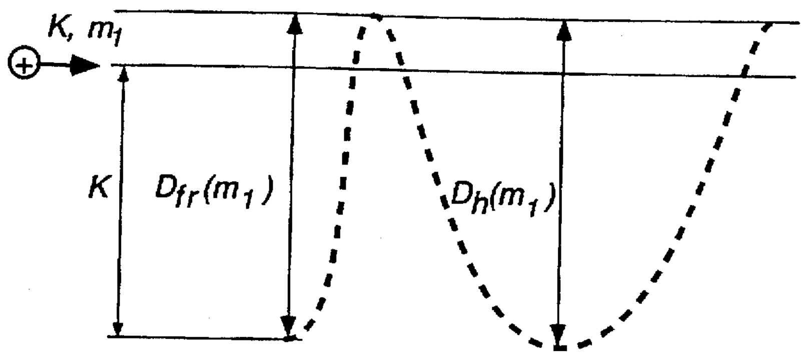
FIGS. 2*a*, 2*b* and 2*c* illustrate external ion injection for ions having kinetic energy K for masses $m_1$, $m_2$ and $m_3$ respectively.
Figure 2B:
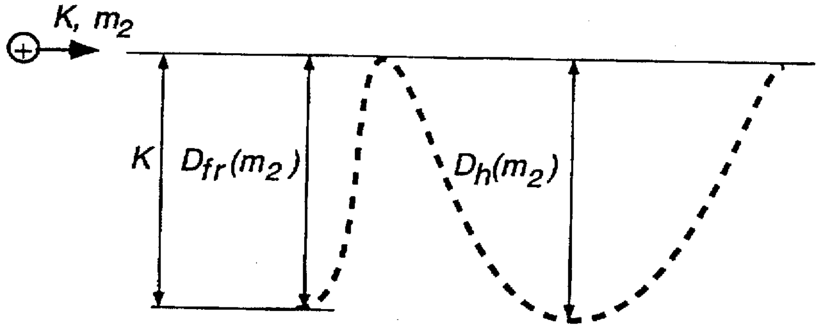

For a beam of ions having a variety of masses formed in an external ionization ion source which is positioned essentially outside the main quadrupole trapping field of the ion trap, the ions experience different effective barriers to entry into the ion trap depending on their masses, as shown in FIG. 2(*a–c*). For these externally produced ions to enter the ion trap, they have to overcome a fringe field barrier formed at the ion entering aperture due to the presence of the main quadrupole field in the trap. The absolute value of this depends on the ion mass m, as shown by equation (1). Mass dependence of the fringe field barrier causes problems for injection of a wide mass range of ions of the same kinetic energy K. If for ions of mass $m_2$ the kinetic energy is close to the fringing field barrier, then the conditions for trapping ions of mass $m_2$ are the most favorable, as shown in FIG. 2*b*.

Figure 2C:
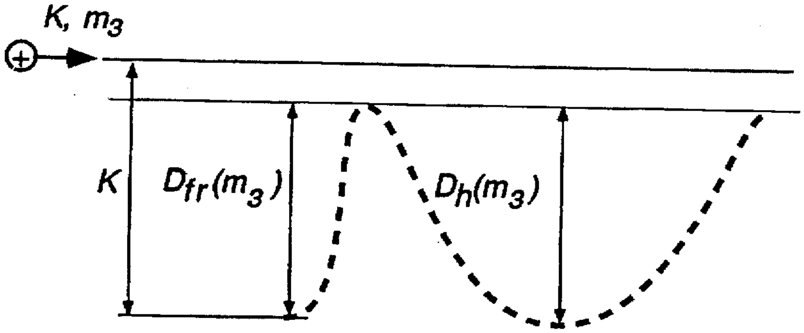

For a mass $m_1<m_2$ the fringe field barrier is larger compared to $m_2$, thus preventing ions of mass $m_1$ from entering the trap, as shown in FIG. 2*a*. For ions with mass $m_3>m_2$ the fringe field barrier is smaller compared to $m_2$, and ions have an excess of kinetic energy $K-D_{ff}(m_3)$ in the trap as shown in FIG. 2*c*, this increasing the chances that the ions will fly through the trap and strike the opposite trap electrode or exit aperture which is located opposite an entrance aperture. Consequently, only ions with the specific mass $m_2$ will be efficiently injected into the trap with a fixed kinetic energy. In practice ions produced by an external ion source have a distribution of kinetic energies, resulting in injection of a range of ion masses at any constant RF level.

To extend the range of injected ions into the trap, the RF level has to be changed during the ion accumulation time, $t_a$. The theoretical optimum scan function can be obtained using the following assumptions: (i) the ion energy spread is relatively small, (ii) the fringe field barrier can be described by equation (1) and (iii) the number of injected ions of each mass should be proportional to the ion density with identical masses of the external ion beam. The last assumption can be restated as a requirement that an equal amount of time be spent with the optimum injection conditions for each mass in the range of ion masses to be injected. The total accumulation time $t_a$ then can be considered as being separated into infinitesimal time intervals dt during which only the specific mass m(t) is optimally injected into the trap. We consider a single linear function progressing from the starting lower mass $m_i$ to the final higher mass $m_f$. The mass m(t) being preferentially injected at a time t during the ion accumulation time $t_a$ is given by the expression:

$$m(t)=m_i+(m_f-m_i)\frac{t}{t_a} \tag{3}$$

By combining equations (2) and (3) one can obtain the RF level in the trap as a function of time V(t) for a linear mass ramp $$V(t)=V_i\left[1+\left(\frac{m_f}{m_i}-1\right)\frac{t}{t_a}\right]^{1/2} \tag{4}$$

The RF level $V_i$ is optimum for injection of $m_i$ and is determined experimentally. In fact, it is possible to determine the optimum RF amplitude $V_0$ for any available mass $m_0$ and then use that value considering that $$V\propto\sqrt{m} \tag{5}$$

according to equation (2) to calculate the optimum voltage V for any ion mass m from $$V=V_0\sqrt{\frac{m}{m_0}} \tag{6}$$

According to the present invention, uniform efficiency of ion injection into the ion trap is achieved over a wide mass range when the ion storage RF level is varied according to equation (4) during the ion accumulation time $t_a$.

The non-linear RF ramp described by equation (4) can be difficult to implement in practice so equation (4) can be linearized to obtained a linear RF ramp:

$$V(t)=V_i+\frac{V_f-V_i}{t_a}\,t \tag{7}$$

or the accumulation time may be subdivided into two or more segments during each of which the RF storage level is varied in a linear manner according to equation (7). Obviously a sufficiently large number of linear segments will produce a result which is equivalent to the functional form of equation (4).

Figure 3:
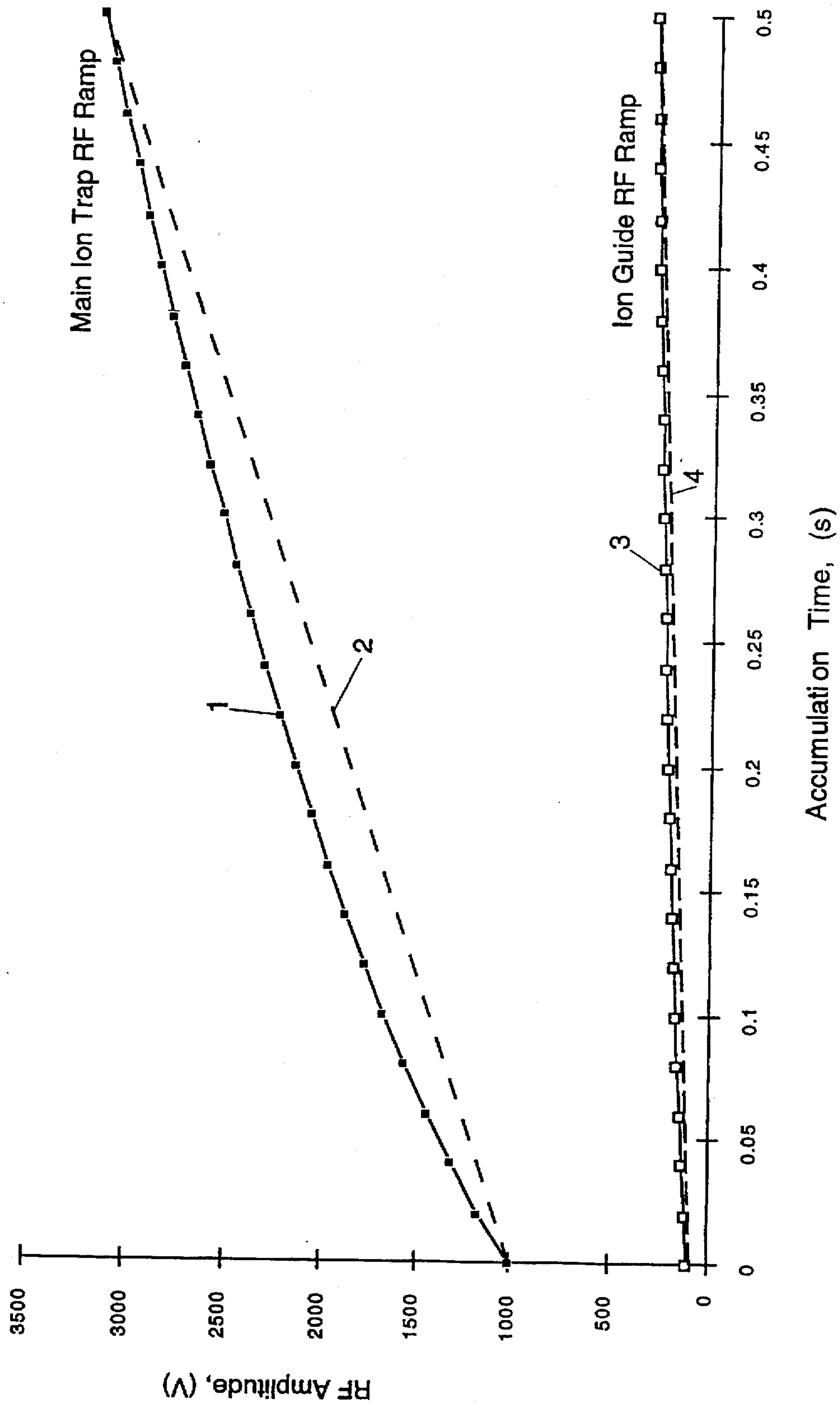
FIG. 3 is a plot of RF amplitude as a function of the accumulation time for both the main ion trap RF amplitude and for the ion guide RF amplitude.

FIG. 3 shows plots for the RF ramp which is calculated according to equation (4), graph 1, and a linearized ramp, graph 2, calculated according to equation (7) for the injection of ions in the mass-to-charge range from 200 to 2000 during accumulation time of 0.5 seconds. In FIG. 3, graph 3 illustrates the proportional relationship between ion guide RF amplitude and main ion trap RF amplitude for a non-linear RF ramp 1. Graph 4 of FIG. 3 is a linearized ramp for RF amplitude. In this case the radio frequency voltage on the ion guide is ramped to provide equivalent conditions for different mass-to-charge ratios also during ion transport through the RF ion guide. The typical frequencies of the ion guide RF field, $w_{ig}$ and main RF ion trap frequency w are about 1 MHz and both can be derived from a single oscillator, so the RF field in the trap is synchronized with the RF field in the ion guide. The DC voltage offset $U_{ig}$ can be set in the low voltage range from 0.5 to 50 V. During the ion injection the ion trap is pressurized with a buffer gas to a pressure range of about $10^{-1}$ to $10^{-5}$ Torr. The presence of the buffer gas increases the ion injection efficiency. Collisions of ions with this buffer gas also result in a cooling of the ion population in the trap and a consequent focusing of the ions into the central region of the trap. After the process of ion injection is finished, ions can be analyzed with a variety of standard ion trap mass analyzing techniques, (March and Hughes, Ion Trap Mass Spectrometry) or pulsed out into a different mass analyzing device.

Figure 4:
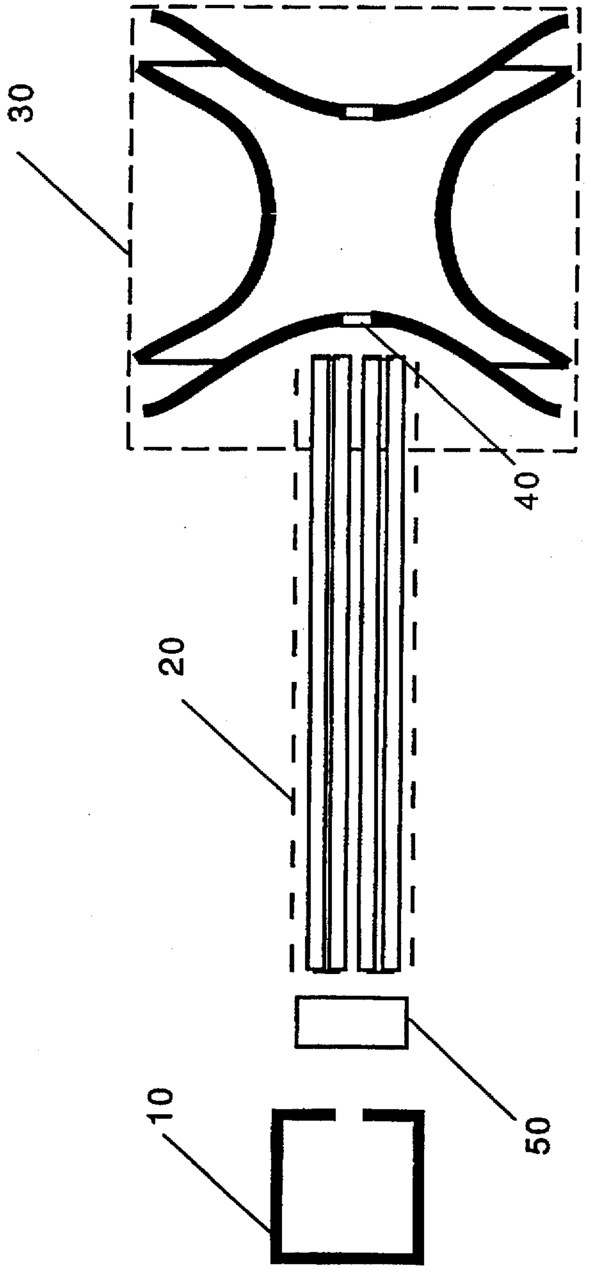
FIG. 4 is a schematic diagram of an ion trap mass spectrometer for performing a method of injection of externally produced ions according to the preferred embodiment of the present invention.

FIG. 4 shows a schematic diagram of the ion trap mass spectrometer used for external ion introduction. In the preferred embodiment of the present invention, ions are formed in a continuous manner by external ion source 10. The ions are extracted from source 10 and shaped into a beam by ion optics 50. The ion beam is directed into radio-frequency ion guide 20 which is positioned near an entrance end cap of ion trap 30. Ions are transferred by the radio-frequency ion guide into ion trap 30 through entrance aperture 40. The ion beam is gated by applying the appropriate pulsed voltages to ion optics 50 so that ions enter the ion trap only during the total predetermined ion accumulation time, $t_a$. The radio-frequency ion guide operates with an AC voltage of frequency $w_{ig}$, amplitude $V_{ig}$ and DC voltage $U_{ig}$ with respect to the ion trap. The radio-frequency ion guide is also pressurized to a pressure in the range of $10^{-1}$ to $10^{-5}$ Torr with a buffer gas such as helium or air to damp ion motion and concentrate ions toward the center of the ion guide. Ions entering ion guide 20 from conventional ion sources typically have a broad range of kinetic energies. The ions coming out of the ion guide have a near thermal energy distribution due to the presence of a buffer gas in the ion guide. Ion guide voltages $V_{ig}$ and $U_{ig}$, as well as the ion trap storage RF amplitude $V_i$, can be optimized for the maximum or near maximum injection efficiency of a test ion with a given mass $m_i$. Equation (4) defines the optimum injection ramp of all ions in the specified mass range $[m_i, m_f]$. In practice, a linearized ramp based on equation (7) can be used. This linearized ramp can be defined with only one experimentally obtained optimum voltage $V_i$ while calculating the final ramp voltage, $V_f$ according to equation (6). Alternatively, the final voltage, $V_f$, for the RF ramp can be obtained experimentally by maximizing ion injection efficiency for the final mass-to-charge ratio, $m_f$, of a specified mass-to-charge range, $[m_i, m_f]$. In accordance with the present invention, the calculated RF amplitude ramp is applied during the accumulation time $t_a$ to achieve uniform injection efficiency across the specified mass-to-charge range. As an enhancement of the present invention, during the accumulation time, the radio frequency voltage on the ion guide $V_{ig}$ can also be changed as a function of RF ion trap amplitude during the accumulation time.

Figure 5A:
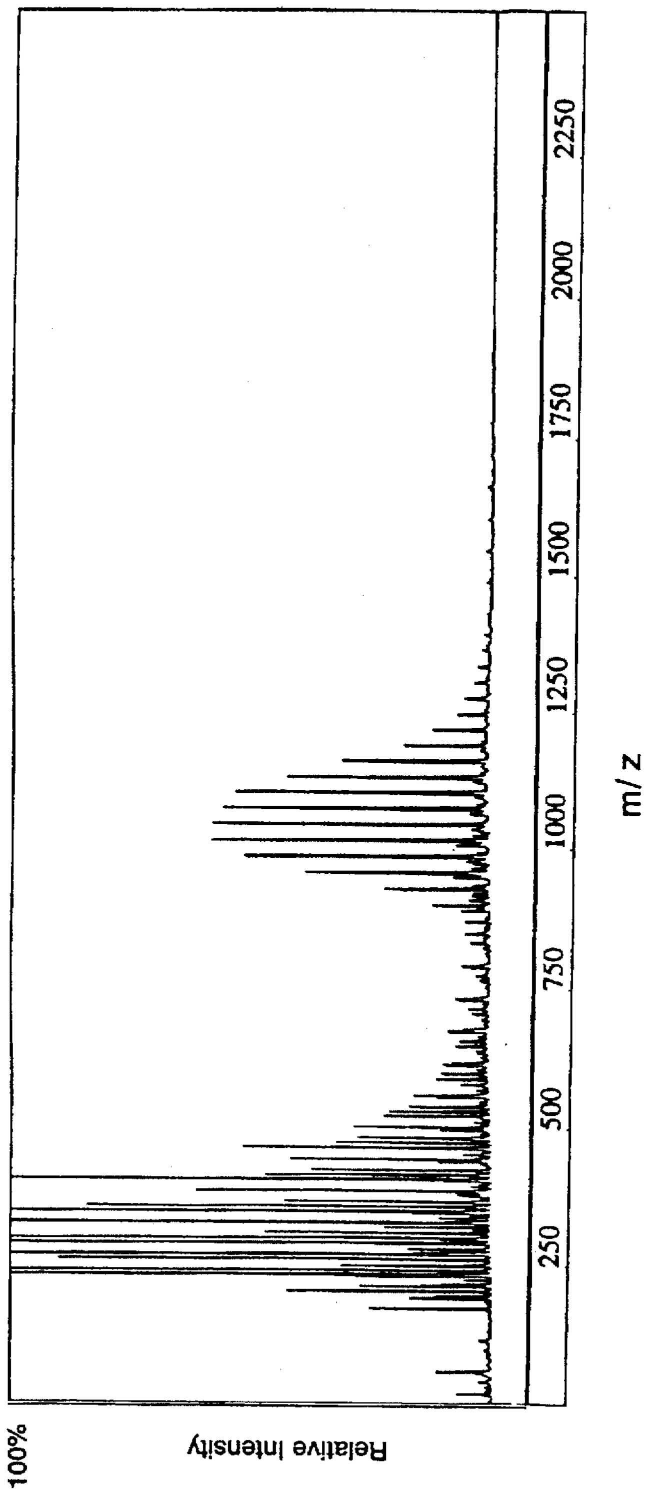
FIGS. 5*a* and 5*b* are full-scan mass spectra of polypropylene glycol compounds.
Figure 5B:
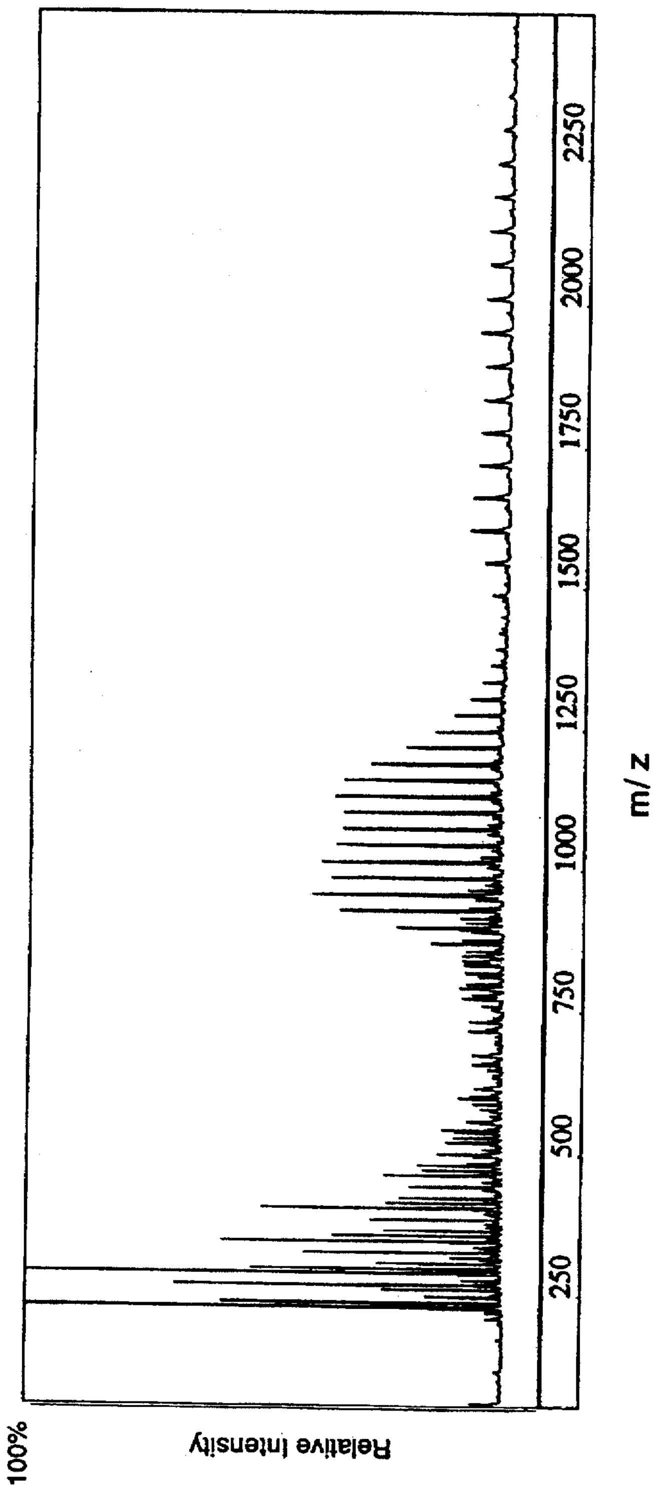

A series of experiments were performed according to the method of the present invention utilizing an ion-trap time-of-flight mass spectrometer manufactured by R. M. Jordan Co., Grass Valley, Calif. Ions were injected into the ion trap from an atmospheric pressure ion source. The RF ion guide was a hexapole with characteristic radius of 2 mm. FIG. 5a shows a mass spectrum of a mixture of polypropylene glycol compounds (PPG-2000), obtained with constant RF level on the ion trap of about 2.6 kV, 1 MHz and 15 volt DC offset on the hexapole with 200 V at 1 MHz RF voltage on the hexapole (prior art). FIG. 5b shows a spectrum obtained when the RF level on the trap was ramped during the accumulation time according to the present invention from $V_i$=2 kV to $V_f$=3.2 kV. The spectrum in FIG. 5a contains only mass peaks in the mass range from 200 to 1300, with strong discrimination of the peak intensities at both sides of the spectrum. The spectrum in FIG. 5b contains ion peaks from 200 to 2400 with much less discrimination. The comparison of FIG. 5a and FIG. 5b clearly demonstrates that a much wider ion mass range can be injected into the trap while operating according to the present invention.

Figure 6A:
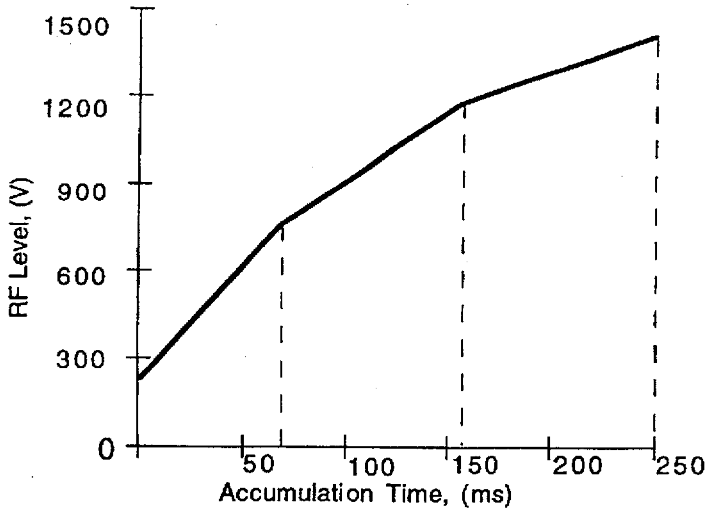
FIG. 6*a* shows a three segment linearized RF ramp.
Figure 6B:
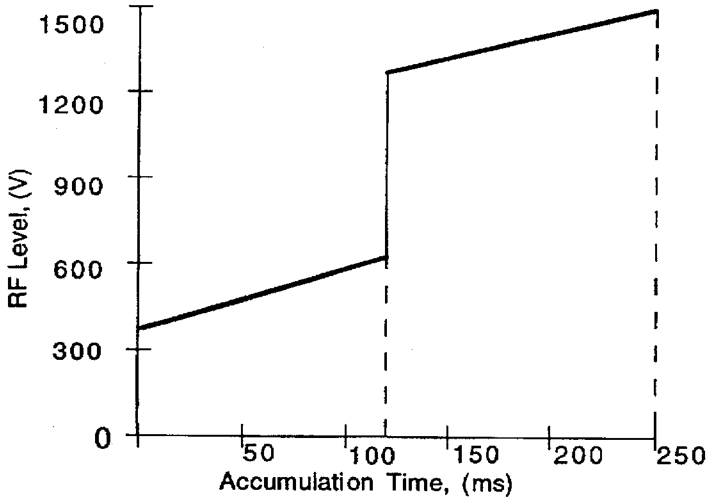
FIG. 6*b* shows a two-linear segment RF ramp with a jump therebetween.
Figure 6C:
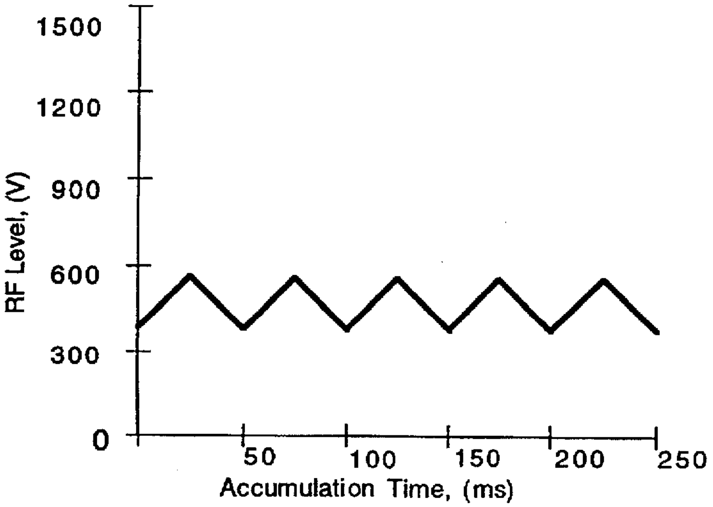
FIG. 6*c* shows a multiple segment bidirectional RF ramp.

FIGS. 6a–6c show different RF ramp arrangements during the accumulation time. The accumulation time for these cases is equal to 0.25 seconds. However, the accumulation time may be scaled depending on the intensity of the external ion beam and required detection limits.

FIG. 6a shows a three-segment RF ramp obtained by linearizing equation (4) allowing for ion accumulation over a wide mass range.

FIG. 6b shows a two-segment RF ramp obtained by linearizing equation (4) allowing for ion accumulation over two separate mass ranges.

FIG. 6c shows a multiple segment RF ramp allowing for uniform trapping efficiency over a narrow mass range.

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. A method of ion introduction and trapping comprising the steps of:

(a) providing a radio frequency (RF) ion trap with a buffer gas;

(b) producing a continuous ion beam from an external ion source;

(c) directing said beam to said RF ion trap through a gating device for a predetermined period of accumulation time to allow said ion beam to enter said ion trap;

(d) applying an RF voltage to said ion trap to create a main RF trap field therein for trapping ions over a range of masses; and (e) changing an amplitude of said RF voltage adiabatically for achieving a uniform trapping efficiency for ions of said ion beam over a predetermined mass range.

2. The method of claim 1, wherein in the step of changing an amplitude of the RF voltage V(t) is varied from an RF voltage $V_i$ to an RF voltage $V_f$ during an accumulation time $t_a$ for trapping the ions with the mass range from mass $m_i$ to a mass $m_f$ according to the equation:

$$V(t) = V_i\left[1+\left(\frac{m_f}{m_i}-1\right)\frac{t}{t_a}\right]^{1/2}.$$

3. The method of claim 2, wherein said RF amplitude is decreasing from the initial voltage $V_i$ to the final voltage $V_f$ during said accumulation time.

4. The method of claim 2, wherein said RF amplitude is increasing from the initial voltage $V_i$ to the final voltage $V_f$ during said accumulation time.

5. The method of claim 4, wherein a non-linear relationship between said RF amplitude and said accumulation time is approximated by a linear RF ramp having substantially identical RF amplitude values for said initial and final amplitudes within said total accumulation time.

6. A method of cumulative ion injection from a continuous ion beam into a radio-frequency (RF) ion trap which is filled with a buffer gas comprising the steps of:

(a) directing and gating said ion beam to said RF ion trap for a predetermined period of accumulation time;

(b) applying an RF voltage to said ion trap to create a main RF trap field therein for trapping ions having masses within a mass range;

(c) dividing said predetermined period of accumulation time into a plurality of segments; and (d) changing an amplitude of said RF voltage adiabatically within each said segment for achieving a uniform trapping efficiency for ions of said ion beam over a predetermined mass range.

7. The method of claim 6, wherein said RF amplitude within each of said plurality of said segments is a linear ramp.

8. The method of claim 7, wherein the relationship between values of said RF amplitude V(t) between an RF amplitude $V_i$ and an RF amplitude $V_f$ within each of said plurality of said segments is defined according to the equation:

$$V(t) = V_i\left[1+\left(\frac{m_f}{m_i}-1\right)\frac{t}{t_a}\right]^{1/2}$$

wherein $m_i$ is an initial mass for said segment, $m_f$ is the final mass for said segment, and $t_a$ is an accumulation segment time.

9. The method of claim 7, wherein said step of changing an amplitude further comprises a step of changing said RF amplitude within each said segment by increasing said RF amplitude from an initial relatively low value to a final relatively high value or decreasing said RF amplitude from initial relatively high value to a final relatively low value.

10. The method of claim 9, wherein each adjacent pair of said segments comprises a linear ramp with increased RF amplitude and a linear ramp with decreased amplitude respectively, wherein each ramp with increasing amplitude is adjacent to each ramp with decreasing amplitude.

11. The method of claim 6, further comprising a step of guiding ions from an ion source to said ion trap through an RF ion guide.

12. The method of claim 11, wherein in the step of guiding ions through an RF ion guide, a predetermined amplitude RF voltage and a predetermined amplitude DC voltage are applied to said RF ion guide to transmit said ion beam therethrough.

13. The method of claim 12, wherein the amplitudes of said voltages applied to said RF ion guide are changed as a function of the amplitude of said main RF ion trap field during said accumulation time.

14. The method of claim 13, wherein the amplitude of the RF voltage applied to said RF ion guide is changed during said accumulation time proportionally to the amplitude of said main RF ion trap field.

* * * * *